US012007610B2

(12) United States Patent
Messer et al.

(10) Patent No.: US 12,007,610 B2
(45) Date of Patent: Jun. 11, 2024

(54) WAVEGUIDE COMBINERS HAVING A PASS-THROUGH IN-COUPLER GRATING

(71) Applicant: Applied Materials, Inc., Santa Clara, CA (US)

(72) Inventors: Kevin Messer, Mountain View, CA (US); Samarth Bhargava, Saratoga, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 17/662,354

(22) Filed: May 6, 2022

(65) Prior Publication Data
US 2022/0357529 A1 Nov. 10, 2022

Related U.S. Application Data

(60) Provisional application No. 63/185,543, filed on May 7, 2021.

(51) Int. Cl.
 *G02B 6/42* (2006.01)
(52) U.S. Cl.
 CPC ......... *G02B 6/4204* (2013.01); *G02B 6/4291* (2013.01)
(58) Field of Classification Search
 CPC ............................ G02B 6/4204; G02B 6/4291; G02B 27/0172; G02B 2027/0112;
 (Continued)

(56) References Cited

U.S. PATENT DOCUMENTS

2019/0155034 A1* 5/2019 Singer .................. G02B 6/0076
2019/0179149 A1* 6/2019 Curtis .................. G02B 6/0076
(Continued)

FOREIGN PATENT DOCUMENTS

EP          3671320 A1    6/2020
KR     2020-0080048 A    7/2020
(Continued)

OTHER PUBLICATIONS

PCT Notification of Transmittal of the International Search Report and the Written Opinion of the International Searching Authority for International Application No. PCT/US2022/028158; dated Aug. 26, 2022.

*Primary Examiner* — Tina M Wong
(74) *Attorney, Agent, or Firm* — Patterson + Sheridan, LLP

(57) ABSTRACT

Waveguide combiners having a pass-through in-coupler grating are described herein. The waveguide combiners include at least one microdisplay and a stack of at least two waveguide layers. In one configuration of a waveguide combiner described herein, the green FOV and the blue FOV only propagate in a first waveguide and the red FOV only propagates in a second waveguide. In another configuration of a waveguide combiner described herein, the blue FOV, the red FOV, and the green FOV only propagate in the first waveguide, the second waveguide, and a third waveguide respectively. The waveguide combiners including the stack of waveguide layers reduces luminance non-uniformity, color non-uniformity, double-images, and other non-uniformities of the overlayed images from a first microdisplay and, in some embodiments, a second microdisplay.

15 Claims, 3 Drawing Sheets

(58) Field of Classification Search
CPC .... G02B 2027/0118; G02B 2027/0125; G02B 27/0081; G02B 6/0068; G02B 6/0076
See application file for complete search history.

(56) References Cited

U.S. PATENT DOCUMENTS

| | | | |
|---|---|---|---|
| 2019/0317270 A1* | 10/2019 | Tammela | ............ G02B 6/0026 |
| 2021/0026135 A1 | 1/2021 | Ishii et al. | |
| 2022/0128744 A1* | 4/2022 | Bohn | ................ G02B 27/0103 |

FOREIGN PATENT DOCUMENTS

| | | | |
|---|---|---|---|
| WO | 2019-118930 A1 | 6/2019 | |
| WO | 2020-139755 A1 | 7/2020 | |

* cited by examiner

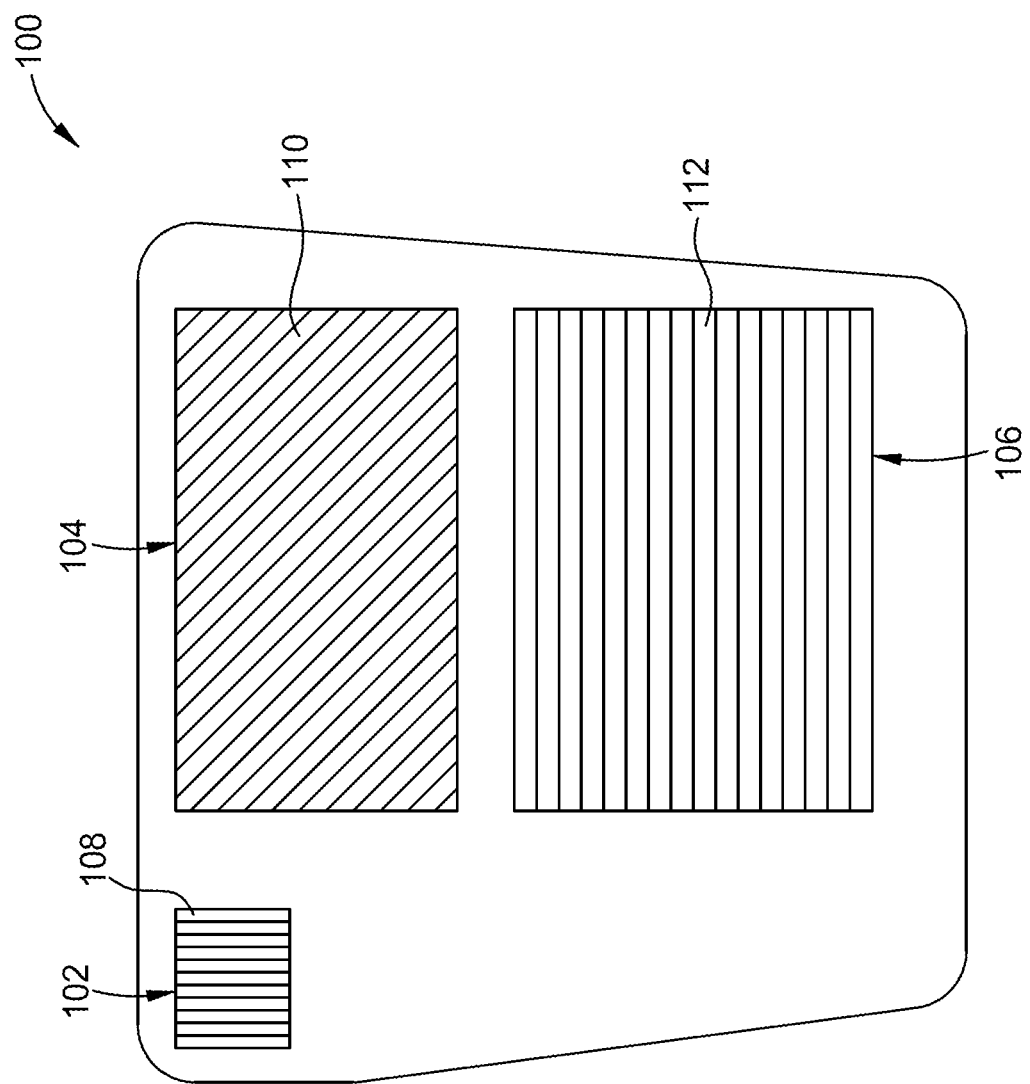

WAVEGUIDE COMBINERS HAVING A PASS-THROUGH IN-COUPLER GRATING

CROSS-REFERENCE TO RELATED APPLICATIONS

This application claims benefit of U.S. Provisional Patent Application No. 63/185,543, filed May 7, 2021, which is herein incorporated by reference in its entirety.

BACKGROUND

Field

Embodiments of the present disclosure generally relate to augmented reality waveguide combiners. More specifically, embodiments described herein relate to waveguide combiners having a pass-through in-coupler grating.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Waveguide combiners are used to assist in overlaying images. Generated light is in-coupled into a waveguide combiner, propagated through the augmented waveguide combiner, out-coupled from the augmented waveguide combiner, and overlaid on the ambient environment. Light is coupled into and out of augmented waveguide combiners using surface relief gratings.

A waveguide combiner may include a stack of waveguide layers such that red, green, and blue channels of light are displayed in an overlaid image. The overlaid image may include at least one of a red field of view (FOV), a green FOV, or a blue FOV that propagate in at least two waveguide layers of the stack of waveguide layers. The propagation of at least one FOV in in at least two layers of the stack of waveguide layers may result in one or more of luminance non-uniformity, color non-uniformity, double-images, and other non-uniformities of the overlaid images.

Accordingly, what is needed in the art are waveguide combiners having a pass-through in-coupler grating.

SUMMARY

In one embodiment, a device is provided. The device includes a microdisplay operable to project a red pupil, a green pupil, and a blue pupil, and a stack of waveguide layers, each of the waveguide layers having an in-coupler grating and an out-coupler grating. The stack of waveguide layers includes a first waveguide layer operable to in-couple a green channel and a blue channel into the first waveguide layer and allow a red channel to pass-through such that a green field of view (FOV) of the green channel and a blue FOV of the blue channel are only out-coupled from the first waveguide layer and the red channel is only in-coupled by a second waveguide layer, and the second waveguide layer operable to in-couple the red channel such that a red FOV of the red channel is only out-coupled from the second waveguide layer.

In another embodiment, a device is provided. The device includes a microdisplay operable to project a red pupil, a green pupil, and a blue pupil, and a stack of waveguide layers, each of the waveguide layers having an in-coupler grating and an out-coupler grating. The stack of waveguide layers includes a first waveguide layer operable to in-couple a green channel and a blue channel into the first waveguide layer and allow a red channel to pass-through such that a green field of view (FOV) of the green channel and a blue FOV of the blue channel are only out-coupled from the first waveguide layer and the red channel is only in-coupled by a second waveguide layer, the second waveguide layer operable to in-couple the red channel such that a red FOV of the red channel is only out-coupled from the second waveguide layer, and a pass-through filter disposed between the first waveguide layer and the second waveguide layer or coupled to an underside surface of the second waveguide layer.

In yet another embodiment, a device is provided. The device includes at least one microdisplay operable to project one or more of a red pupil, a green pupil, and a blue pupil, a stack of waveguide layers, each of the waveguide layers having an in-coupler grating and an out-coupler grating. The stack of waveguide layers includes a first waveguide layer operable to in-couple a blue channel into the first waveguide layer and allow a red channel to pass-through such that a blue field of view (FOV) of the blue channel is only out-coupled from the first waveguide layer and the red channel is only in-coupled by a second waveguide layer, the second waveguide layer operable to in-couple the red channel into the second waveguide layer such that a red FOV of the red channel is only out-coupled from the second waveguide layer, and a third waveguide layer operable to in-couple a green channel into the third waveguide layer such that a green FOV of the green channel is only out-coupled from the third waveguide layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

The disclosure contains at least one drawing executed in color. Copies of this disclosure with color drawings will be provided to the Office upon request and payment of the necessary fee. As the color drawings are being filed electronically via EFS-Web, only one set of the drawings is submitted.

FIG. 1 is a perspective, frontal view of a waveguide layer according to embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2B:
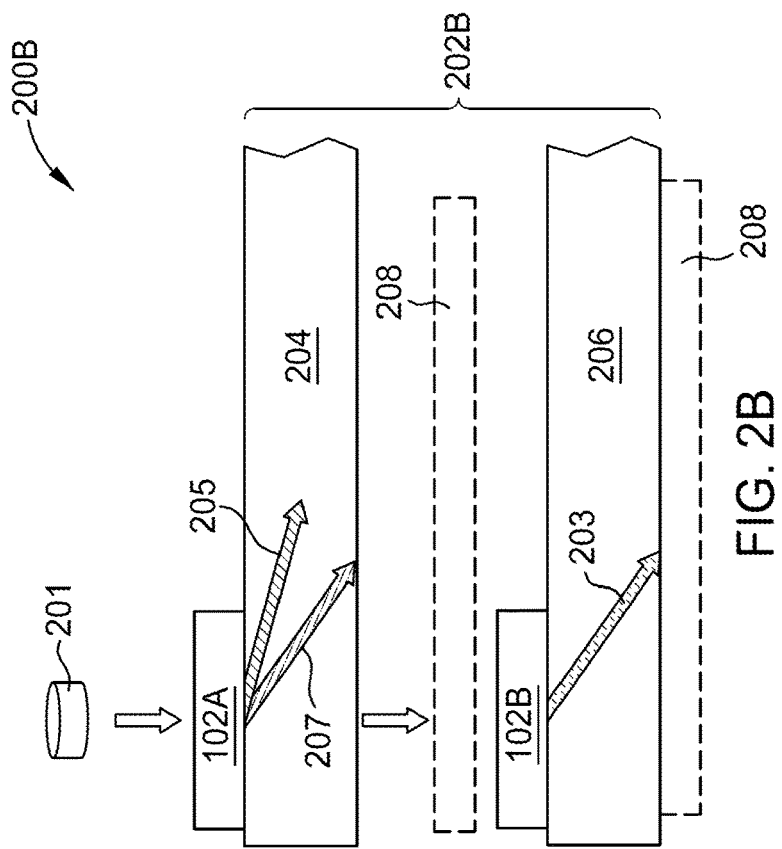
FIGS. 2A and 2B are schematic, cross sectional views of a waveguide combiner according to an embodiments.

Embodiments described herein relate to waveguide combiners having a pass-through in-coupler grating. The waveguide combiners include at least one microdisplay and a stack of at least two waveguide layers. Each waveguide layer includes an in-coupler grating and an out-coupler grating.

FIG. 1 is a perspective, frontal view of a waveguide layer 100. It is to be understood that the waveguide layer 100 described below is an exemplary waveguide layer 100 and other waveguide layers may be used with or modified to accomplish aspects of the present disclosure.

The waveguide layer 100 includes an in-coupler grating 102 defined by a plurality of first structures 108, an pupil expansion grating 104 defined by a plurality of second structures 110, and an out-coupler grating 106 defined by a plurality of third structures 112. The in-coupler grating 102 receives incident beams of light (a virtual image) having an intensity from a microdisplay. Each first structure 108 of the in-coupler grating 102 splits the incident beams into a plurality of modes, each beam having a mode. Zero-order mode (T0) beams are refracted back or lost in the waveguide layer 100, positive first-order mode (T1) beams are coupled though the waveguide layer 100 to the pupil expansion grating 104, and negative first-order mode (T-1) beams propagate in the waveguide layer 100 in a direction opposite to the T1 beams. Ideally, the incident beams are split into T1 beams that have all of the intensity of the incident beams in order to direct the virtual image to the pupil expansion grating 104. The T1 beams undergo total-internal-reflection (TIR) through the waveguide layer 100 until the T1 beams come in contact with the plurality of second structures 110 of the pupil expansion grating 104.

The T1 beams split into (1) T0 beams refracted back or lost in the waveguide layer 100, (2) T1 beams that undergo TIR in the pupil expansion grating 104 until the T1 beams contact another second structure of the plurality of second structures 110, and (3) T-1 beams that are coupled through the waveguide layer 100 to the out-coupler grating 106. The T1 beams that undergo TIR in the pupil expansion grating 104 continue to contact second structures 110 until either the intensity of the T1 beams coupled through the waveguide layer 100 to the pupil expansion grating 104 is depleted, or the remaining T1 beams propagating through the pupil expansion grating 104 reach the end of the pupil expansion grating 104. The plurality of second structures 110 must be tuned to control the T1 beams coupled through the waveguide layer 100 to the pupil expansion grating 104 in order to control the intensity of the T-1 beams coupled to the out-coupler grating 106 to modulate a FOV of the virtual image produced from the microdisplay from a user's perspective and increase a viewing angle from which a user can view the virtual image.

The T-1 beams coupled through the waveguide layer 100 to the out-coupler grating 106 undergo TIR in the waveguide layer 100 until the T-1 beams contact a third structure 112 of the plurality of third structures 112 where the T-1 beams are split into (1) T0 beams refracted back or lost in the waveguide layer 100, (2) T1 beams that undergo TIR in the out-coupler grating 106 until the T1 beams contact another third structure 112 of the plurality of third structures 112, and (3) T-1 beams that are coupled out of the waveguide layer 100. The T1 beams that undergo TIR in the out-coupler grating 106 continue to contact third structures 112 of the plurality of third structures 112 until either the intensity of the T-1 beams coupled through the waveguide layer 100 to the out-coupler grating 106 is depleted, or the remaining T1 beams propagating through the out-coupler grating 106 have reached the end of the out-coupler grating 106. The plurality of third structures 112 of the out-coupler grating 106 further modulate the FOV of the virtual image produced from the microdisplay from the user's perspective and further increase the viewing angle from which the user can view the virtual image.

Figure 2A:
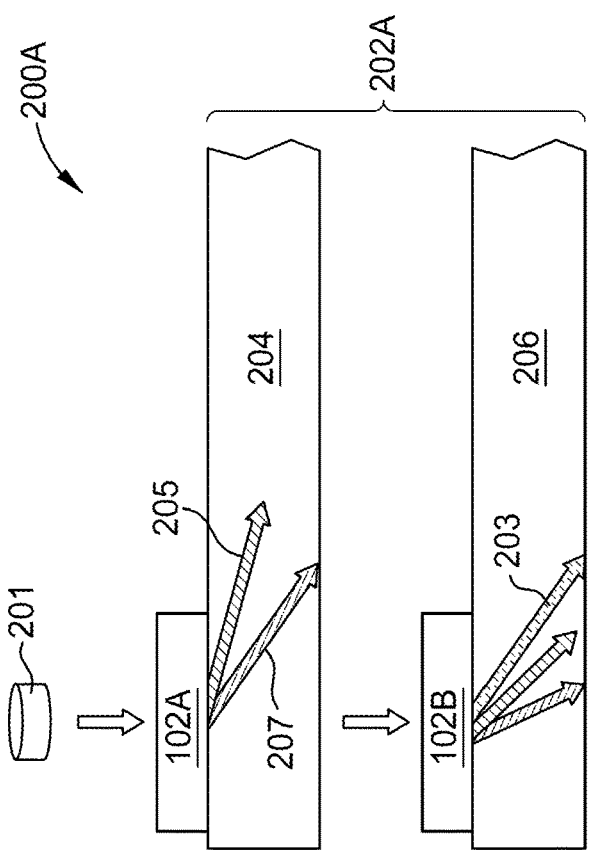

FIG. 2A is a schematic, cross sectional view of a waveguide combiner 200A. FIG. 2B is a schematic, cross sectional view of a waveguide combiner 200B. The waveguide combiner 200A, 200B includes one microdisplay 201 and a stack 202A, 202B of a first waveguide layer 204 and a second waveguide layer 206. The microdisplay 201 is operable to project a red pupil, a green pupil, and a blue pupil to an in-coupler grating 102A of the first waveguide layer 204. The first waveguide layer 204 and the second waveguide layer 206 include at least the in-coupler grating 102 and an out-coupler grating, such as the out-coupler grating 106. In some embodiments, which can be combined with other embodiments described herein, at least one of the first waveguide layer 204 or the second waveguide layer 206 include a pupil expansion grating, such as the pupil expansion grating 104.

The in-coupler grating 102A is a pass-through in-coupler grating. The in-coupler grating 102A includes a plurality of first structures, such as the first structures 108. The plurality of first structures of the in-coupler grating 102A are operable to in-couple a green channel 205 and a blue channel 207 into the first waveguide layer 204 and allow a red channel 203 to pass-through the first waveguide layer 204. The green channel 205 and the blue channel 207 undergo TIR through the first waveguide layer 204 and are out-coupled as a green FOV and a blue FOV. The plurality of first structures of the in-coupler grating 102B are operable to in-couple the red channel 203 into the second waveguide layer 206. The red channel 203 undergoes TIR through the second waveguide layer 206 and is out-coupled as a red FOV.

The stack 202B further includes a red-pass filter 208. In one embodiment, which can be combined with other embodiments described herein, the red-pass filter 208 is disposed between the first waveguide layer 204 and the second waveguide layer 206. In another embodiment, which can be combined with other embodiments described herein, the red-pass filter 208 is coupled to the underside of the second waveguide layer 206. The red-pass filter 208 is green channel and blue channel absorbing while allowing the red channel 203 to pass-through to the in-coupler grating 102B.

The in-coupler grating 102A is configured such that the plurality of first structures have a period ($\Lambda_{IC}$). The $\Lambda_{IC}$ enables the green channel 205 and the blue channel 207 to be in-coupled to and propagate through the first waveguide layer 204 and enables the red channel 203 to pass through. The $\Lambda_{IC}$ of the in-coupler grating 102A allows the red channel 203 to pass through such that the red channel 203 is in-coupled in and propagated through the second waveguide layer 206. I.e., the red channel 203 is not diffracted in the first waveguide layer 204. To determine $\Lambda_{IC}$, a system of three equations is solved based on $\lambda_R$, $\lambda_G$, $\lambda_B$ (the red channel peak wavelength, the green channel peak wavelength, and the blue channel wavelength), n (the refractive index of the substrate of first waveguide layer 204 and the second waveguide layer 206), $k_{FoV}$ (the extent of the FOV in k-space along the in-coupler grating vector direction), and $k_{mid}$ (the k-space distance along the in-coupler grating vector direction from the origin to the center of the FoV, which describes the tilt of the input FOV).

The first equation is $$\frac{\lambda_G}{\Lambda_{IC}} - k_{mid} + \frac{1}{2}k_{FoV} < n,$$

the second equation is $$\frac{\lambda_R}{\Lambda_{IC}} - k_{mid} - \frac{1}{2}k_{FoV} > n,$$

and the third equation is $$\frac{\lambda_B}{\Lambda_{IC}} - k_{mid} - \frac{1}{2}k_{FoV} > 1.$$

Solving for $\Lambda_{IC}$ and having the in-coupler grating 102A ensure that the out-coupled green FOV and the out-coupled blue FOV are of the green channel 205 and the blue channel 207 from the first waveguide layer 204, and the out-coupled red FOV is from the second waveguide layer 206. The red-pass filter 208 absorbs residuals green and blue light such that the green FOV and the blue FOV only propagate in the first waveguide layer 204. The waveguide combiner 200A, 200B includes the green FOV and the blue FOV that only propagate in the first waveguide layer 204 and the red FOV that only propagates in the second waveguide layer 206. The waveguide combiner 200A, 200B having the stack 202A, 202B reduces luminance non-uniformity, color non-uniformity, double-images, and other non-uniformities of the overlaid images from one microdisplay 201.

Table 1 shows potential $\Lambda_{IC}$'s based on configurations of the waveguide combiner 200A, 200B.

TABLE 1

| n | k_mid | FoV (°) | IC Period (nm) | FoV Offset (°) |
|---|---|---|---|---|
| 1.8 | 0.00 | 18.2 | 317 | 0.0 |
| 1.8 | 0.26 | 21.6 | 277 | 15.3 |
| 1.8 | 0.50 | 27.2 | 248 | 31.0 |
| 2 | 0.00 | 20.2 | 285 | 0.0 |
| 2 | 0.26 | 23.7 | 252 | 15.3 |
| 2 | 0.50 | 29.7 | 228 | 31.1 |
| 2.3 | 0.00 | 23.3 | 248 | 0.0 |
| 2.3 | 0.26 | 26.9 | 223 | 15.4 |
| 2.3 | 0.50 | 33.5 | 204 | 31.5 |
| 2.6 | 0.00 | 26.4 | 219 | 0.0 |
| 2.6 | 0.26 | 30.2 | 199 | 15.5 |
| 2.6 | 0.50 | 37.3 | 184 | 31.9 |

Figure 3B:
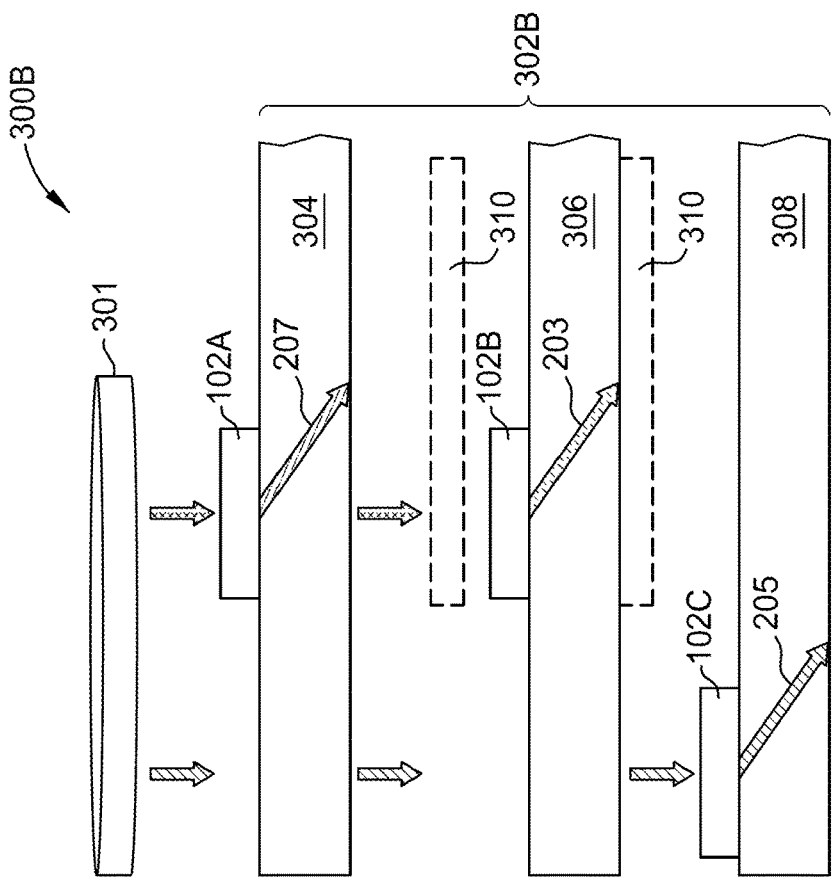
FIGS. 3A and 3B are schematic, cross sectional views of a waveguide combiner according to an embodiments.
Figure 3A:
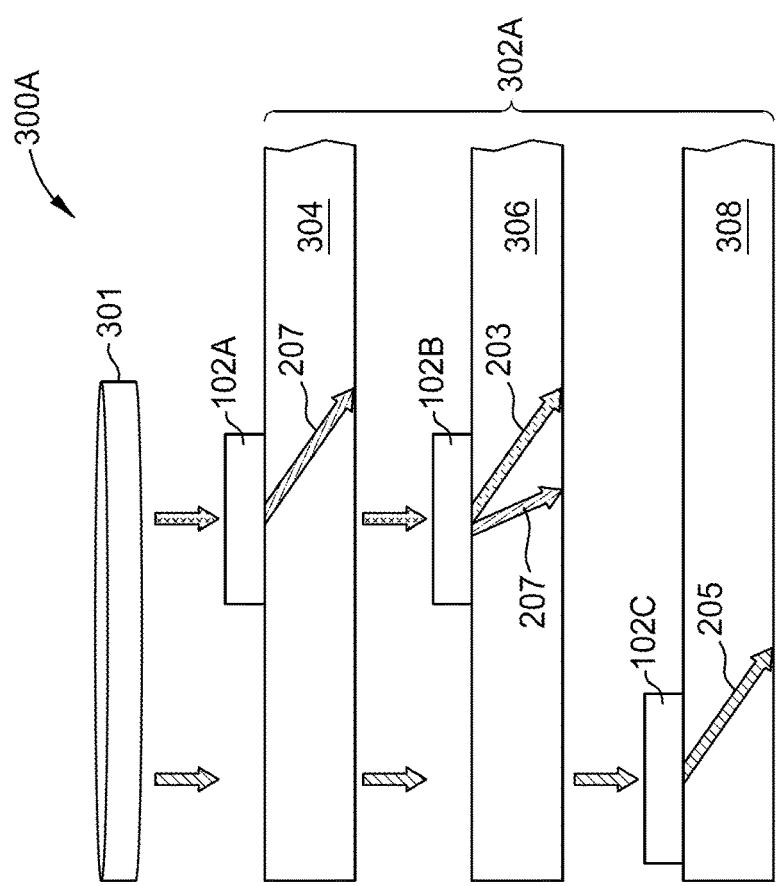

FIG. 3A is a schematic, cross sectional view of a waveguide combiner 300A. FIG. 3B is a schematic, cross sectional view of a waveguide combiner 300B. The waveguide combiner 300A, 300B includes at least one microdisplay 301, and a stack 302A, 302B of a first waveguide layer 304, a second waveguide layer 306, and a third waveguide layer 308. At least one microdisplay 301 is operable to project a green pupil through the first waveguide layer 304 and the second waveguide layer 306 and to the in-coupler grating 102C of the third waveguide layer 308. The microdisplay 301 is operable to project a red pupil and a blue pupil to an in-coupler grating 102A of the first waveguide layer 304. In some embodiments, which can be combined with other embodiments described herein, a first microdisplay is operable to project the green pupil and the second microdisplay is operable to project the red pupil and the blue pupil. The first waveguide layer 304, the second waveguide layer 306, and the third waveguide layer 308 include at least the in-coupler grating 102 and an out-coupler grating, such as the out-coupler grating 106. In some embodiments, which can be combined with other embodiments described herein, at least one of the first waveguide layer 304, the second waveguide layer 306, and the third waveguide layer 308 include a pupil expansion grating, such as the pupil expansion grating 104.

The in-coupler grating 102A is a pass-through in-coupler grating. The in-coupler grating 102A includes a plurality of first structures, such as the first structures 108. The plurality of first structures of the in-coupler grating 102A are operable to in-couple a blue channel 207 into the first waveguide layer 304 and allow a red channel 203 to pass-through the first waveguide layer 304. The blue channel 207 undergoes TIR through the first waveguide layer 304 is out-coupled as a blue FOV. The plurality of first structures of the in-coupler grating 102B are operable to in-couple the red channel 203 into the second waveguide layer 306. The red channel 203 undergoes TIR through the second waveguide layer 306 and is out-coupled as a red FOV. The plurality of first structures of the in-coupler grating 102C are operable to in-couple the green channel 205 into the third waveguide layer 308. The green channel 205 undergoes TIR through the second waveguide layer 306 and is out-coupled as a green FOV.

While the stack 302A, 302B of FIGS. 3A and 3B is depicted with the first waveguide layer 304 disposed over the second waveguide layer 306 and the second waveguide layer 306 disposed over the third waveguide layer 308, in some embodiments, the third waveguide layer 308 may be disposed between the first waveguide layer 304 and the second waveguide layer 306, in other embodiments, the third waveguide layer 308 is disposed over the first waveguide layer 304 that is disposed over the second waveguide layer 306. The layers in the stack 302A, 302B are ordered such that the first waveguide layer 304 operable to in-couple the blue channel 207 is closer to the microdisplay 301 than the second waveguide layer operable to in-couple the red channel 203.

The stack 302B further includes a red-pass filter 310. In one embodiment, which can be combined with other embodiments described herein, the red-pass filter 310 is disposed between the first waveguide layer 304 and the second waveguide layer 306 or is coupled to the underside of the second waveguide layer 306. The red-pass filter 310 is blue channel absorbing while allowing the red channel 203 to pass-through to the in-coupler grating 102B.

The in-coupler grating 102A is configured such that the plurality of first structures have a period ($\Lambda_{IC}$). The $\Lambda_{IC}$ enables the blue channel 207 to be in-coupled to and propagate through the first waveguide layer 204 and enables the red channel 203 to pass through. The $\Lambda_{IC}$ of the in-coupler grating 102A allows the red channel 203 pass through such that the red channel 203 is in-coupled in and propagated through the second waveguide layer 306. I.e., the red channel 203 is not diffracted in the first waveguide layer 304. To determine $\Lambda_{IC}$, a system of three equations is solved based on $\lambda_R$ and $\lambda_B$ (the red channel peak wavelength and the blue channel wavelength), n (the refractive index of the substrate of first waveguide layer 304 and the second waveguide layer 306), $k_{FoV}$ (the extent of the FOV in k-space along the in-coupler grating vector direction), and $k_{mid}$ (the k-space distance along the in-coupler grating vector direction from the origin to the center of the FoV, which describes the tilt of the input FOV).

The first equation is $$\frac{\lambda_B}{\Lambda_{IC}} - k_{mid} + \frac{1}{2}k_{FoV} < n,$$

the second equation is $$\frac{\lambda_R}{\Lambda_{IC}} - k_{mid} - \frac{1}{2}k_{FoV} > n,$$

and the third equation is $$\frac{\lambda_B}{\Lambda_{IC}} - k_{mid} - \frac{1}{2}k_{FoV} > 1.$$

Solving for $\Lambda_{IC}$ and having the in-coupler grating 102A ensure that the out-coupled blue FOV is from the first waveguide layer 304, the out-coupled red FOV is from the second waveguide layer 306, and the out-coupled green FOV is from the third waveguide layer 308. The red-pass filter 310 absorbs residual blue light such that the blue FOV only propagates in the first waveguide layer 304. The waveguide combiner 300A, 300B provide for the blue FOV, the red FOV, and the green FOV that only propagate in the first waveguide layer 304, the second waveguide layer 306, and the third waveguide layer 308 respectively. The waveguide combiner 300A, 300B having the stack 302A. 302B reduces luminance non-uniformity, color non-uniformity, double-images, and other non-uniformities of the overlaid images from the microdisplay.

Table 2 shows potential $\Lambda_{IC}$'s based on configurations of the waveguide combiner 300A, 300B.

TABLE 2

| n | k_mid | FoV (°) | IC Period (nm) | FoV Offset (°) |
|---|---|---|---|---|
| 1.8 | 0.00 | 33.2 | 297 | 0.0 |
| 1.8 | 0.26 | 39.8 | 260 | 16.0 |
| 1.8 | 0.50 | 52.2 | 233 | 33.8 |
| 2 | 0.00 | 37.1 | 268 | 0.0 |
| 2 | 0.26 | 43.9 | 237 | 16.2 |
| 2 | 0.50 | 57.9 | 214 | 34.8 |
| 2.3 | 0.00 | 42.9 | 233 | 0.0 |
| 2.3 | 0.26 | 50.2 | 209 | 16.6 |
| 2.3 | 0.50 | 67.7 | 191 | 37.0 |
| 2.6 | 0.00 | 48.8 | 206 | 0.0 |
| 2.6 | 0.26 | 56.7 | 187 | 17.1 |
| 2.6 | 0.50 | 82.6 | 173 | 41.7 |

In summation, waveguide combiners having a pass-through in-coupler grating are described herein. The waveguide combiners include at least one microdisplay and stack of at least two waveguide layers. In one configuration of a waveguide combiner described herein, the green FOV and the blue FOV only propagate in a first waveguide and the red FOV only propagates in a second waveguide. In another configuration of a waveguide combiner described herein, the blue FOV, the red FOV, and the green FOV only propagate in the first waveguide, the second waveguide, and a third waveguide respectively. The waveguide combiners including the stack of waveguide layers reduces luminance non-uniformity, color non-uniformity, double-images, and other non-uniformities of the overlaid images from a first microdisplay and, in some embodiments, a second microdisplay.

While the foregoing is directed to examples of the present disclosure, other and further examples of the disclosure may be devised without departing from the basic scope thereof, and the scope thereof is determined by the claims that follow.

What is claimed is:

1. An optical augmented reality system, comprising:
a microdisplay operable to project a red pupil, a green pupil, and a blue pupil;
a stack of waveguide layers, each of the waveguide layers having an in-coupler grating and an out-coupler grating, the stack of waveguide layers comprising:
a first waveguide layer having a first in-coupler grating operable to in-couple a green channel and a blue channel into the first waveguide layer and allow a red channel, a first residual of the green channel, and a second residual of the blue channel to pass-through such that a green field of view (FOV) of the green channel and a blue FOV of the blue channel are only out-coupled from the first waveguide layer and the red channel is only in-coupled by a second waveguide layer; and
the second waveguide layer operable to in-couple the red channel such that a red FOV of the red channel is only out-coupled from the second waveguide layer.

2. The system of claim 1, wherein the in-coupler grating of the first waveguide layer includes a plurality of first structures having a period ($\Lambda_{IC}$) that is operable to in-couple the green channel and the blue channel into the first waveguide layer and allow the red channel to pass-through such that the red FOV is only out-coupled from the second waveguide layer.

3. The system of claim 1, wherein a pass-through filter is disposed between the first waveguide layer and the second waveguide layer or is coupled to an underside surface of the second waveguide layer, wherein the pass-through filter is operable to absorb the green channel and the blue channel.

4. An optical augmented reality system, comprising:
a microdisplay operable to project a red pupil, a green pupil, and a blue pupil;
a stack of waveguide layers, each of the waveguide layers having an in-coupler grating and an out-coupler grating, the stack of waveguide layers comprising:
a first waveguide layer having a first in-coupler grating operable to in-couple a green channel and a blue channel into the first waveguide layer and allow a red channel, a first residual of the green channel, and a second residual of the blue channel to pass-through such that a green field of view (FOV) of the green channel and a blue FOV of the blue channel are only out-coupled from the first waveguide layer and the red channel is only in-coupled by a second waveguide layer;

wherein the second waveguide layer is operable to in-couple the red channel such that a red FOV of the red channel is only out-coupled from the second waveguide layer;

wherein the first in-coupler grating comprises a plurality of first structures having a period ($\Lambda_{IC}$); and wherein the $\Lambda_{IC}$ is selected by solving a system of equations for the $\Lambda_{IC}$, the system of equations comprising:

$$\frac{\lambda_B}{\Lambda_{IC}} - k_{mid} + \frac{1}{2}k_{FoV} < n;$$

$$\frac{\lambda_R}{\Lambda_{IC}} - k_{mid} - \frac{1}{2}k_{FoV} > n; \text{ and}$$

$$\frac{\lambda_B}{\Lambda_{IC}} - k_{mid} - \frac{1}{2}k_{FoV} > 1,$$

wherein $\lambda_R$, $\lambda_G$, $\lambda_B$ correspond to a red channel peak wavelength, a green channel peak wavelength, and a blue channel wavelength, n is a refractive index of the first waveguide layer and the second waveguide layer, $k_{FoV}$ is an extent of a FOV in a k-space along an in-coupler grating vector direction, and $k_{mid}$ is a k-space distance along the in-coupler grating vector direction.

5. An optical augmented reality system, comprising:
a microdisplay operable to project a red pupil, a green pupil, and a blue pupil;
a stack of waveguide layers, each of the waveguide layers having an in-coupler grating and an out-coupler grating, the stack of waveguide layers comprising:
a first waveguide layer operable to in-couple a green channel and a blue channel into the first waveguide layer and allow a red channel to pass-through such that a green field of view (FOV) of the green channel and a blue FOV of the blue channel are only out-coupled from the first waveguide layer and the red channel is only in-coupled by a second waveguide layer;
the second waveguide layer operable to in-couple the red channel such that a red FOV of the red channel is only out-coupled from the second waveguide layer; and
a pass-through filter disposed between the first waveguide layer and the second waveguide layer, the pass-through filter operable to absorb the green channel and the blue channel and allow the red channel to pass-through.

6. The system of claim 5, wherein the pass-through filter is disposed between the first waveguide layer and the second waveguide layer and operable to allow the red channel to pass-through to the second waveguide layer.

7. An optical augmented reality system, comprising:
at least one microdisplay operable to project one or more of a red pupil, a green pupil, and a blue pupil;
a stack of waveguide layers, each of the waveguide layers having an in-coupler grating and an out-coupler grating, the stack of waveguide layers comprising:
a first waveguide layer having a first in-coupler grating disposed at a first position on the first waveguide layer operable to in-couple a blue channel into the first waveguide layer and allow a red channel to pass-through such that a blue field of view (FOV) of the blue channel is only out-coupled from the first waveguide layer and the red channel is only in-coupled by a second waveguide layer;

the second waveguide layer having a second in-coupler grating operable to in-couple the red channel into the second waveguide layer such that a red FOV of the red channel is only out-coupled from the second waveguide layer, wherein a lateral position of the first in-coupler grating on the first waveguide layer is substantially the same as a lateral position of the second in-coupler grating on the second waveguide layer such that the first in-coupler grating is vertically aligned with the first in-coupler grating for receiving the red channel passing-through the first in-coupler grating; and a third waveguide layer having a third in-coupler grating operable to in-couple a green channel into the third waveguide layer such that a green FOV of the green channel is only out-coupled from the third waveguide layer, wherein a lateral position of the third in-coupler grating on the third waveguide layer is different from the lateral positions of the first and second in-coupler gratings on the first and second waveguide layers, respectively;

wherein the in-coupler grating of the first waveguide layer includes a plurality of first structures having a period ($\Lambda_{IC}$), and the $\Lambda_{IC}$ is selected by solving a system of equations for the $\Lambda_{IC}$, the system of equations comprising:

$$\frac{\lambda_G}{\Lambda_{IC}} - k_{mid} + \frac{1}{2}k_{FoV} < n;$$

$$\frac{\lambda_R}{\Lambda_{IC}} - k_{mid} + \frac{1}{2}k_{FoV} > n;$$

and $$\frac{\lambda_B}{\Lambda_{IC}} - k_{mid} + \frac{1}{2}k_{FoV} > 1,$$

wherein $\lambda_R$, $\Delta_G$, $\lambda_B$ correspond to a red channel peak wavelength, a green channel peak wavelength, and a blue channel wavelength, n is a refractive index of the first waveguide layer and the second waveguide layer, $k_{FoV}$ is an extent of a FOV in a k-space along an in-coupler grating vector direction, and $k_{mid}$ is a k-space distance along the in-coupler grating vector direction.

8. The system of claim 7, wherein the first waveguide layer is disposed closer to the at least one microdisplay than the second waveguide layer.

9. The system of claim 7, wherein the first waveguide layer is disposed on the second waveguide layer and the second waveguide layer is disposed on the third waveguide layer.

10. The system of claim 7, wherein the first waveguide layer is disposed on the third waveguide layer and the third waveguide layer is disposed on the second waveguide layer.

11. The system of claim 10, wherein the third waveguide layer is operable to allow the red channel to pass-through such that the red channel is only in-coupled by the second waveguide layer.

12. The system of claim 10, wherein a pass-through filter is disposed between the first waveguide layer and the third waveguide layer, the third waveguide layer and the second waveguide layer, or is coupled to an underside surface of the second waveguide layer, wherein the pass-through filter is operable to absorb the green channel and the blue channel.

13. The system of claim 7, wherein the third waveguide layer is disposed on the first waveguide layer and the first waveguide layer is disposed on the second waveguide layer.

14. The system of claim 13, wherein the third waveguide layer is operable to allow the blue channel and the red channel to pass-through to the first waveguide layer.

15. The system of claim 13, wherein a pass-through filter is disposed between the first waveguide layer and the second waveguide layer, or is coupled to an underside surface of the second waveguide layer, wherein the pass-through filter is operable to absorb the green channel and the blue channel.

* * * * *